W. S. OSBORNE.
METHOD OF DESICCATING FLUID SUBSTANCES.
APPLICATION FILED NOV. 8, 1906.
962,781.
Patented June 28, 1910.
3 SHEETS—SHEET 3.
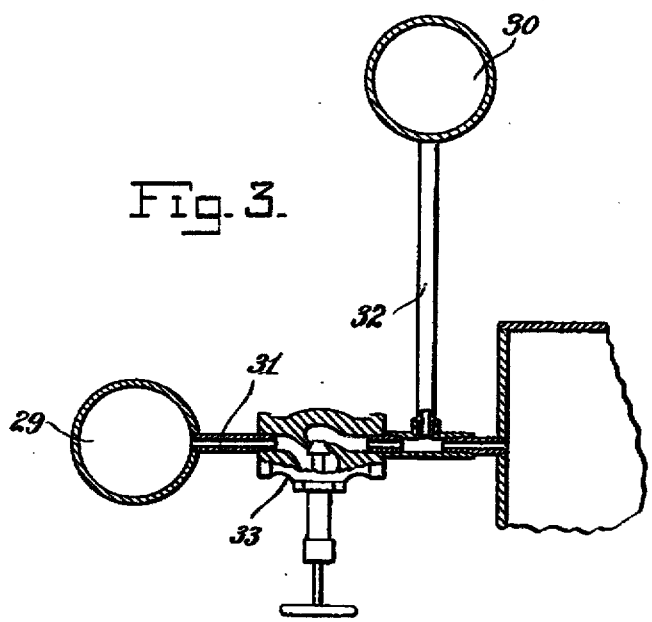
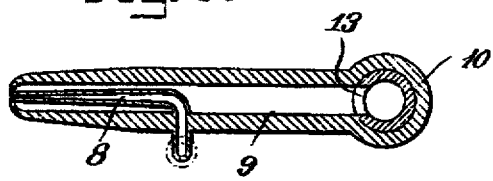
Witnesses:
E. C. Wurdeman
A. C. Richardson.
Inventor:
William S. Osborne
by Phillips Van Eurew Fish
Attorneys.

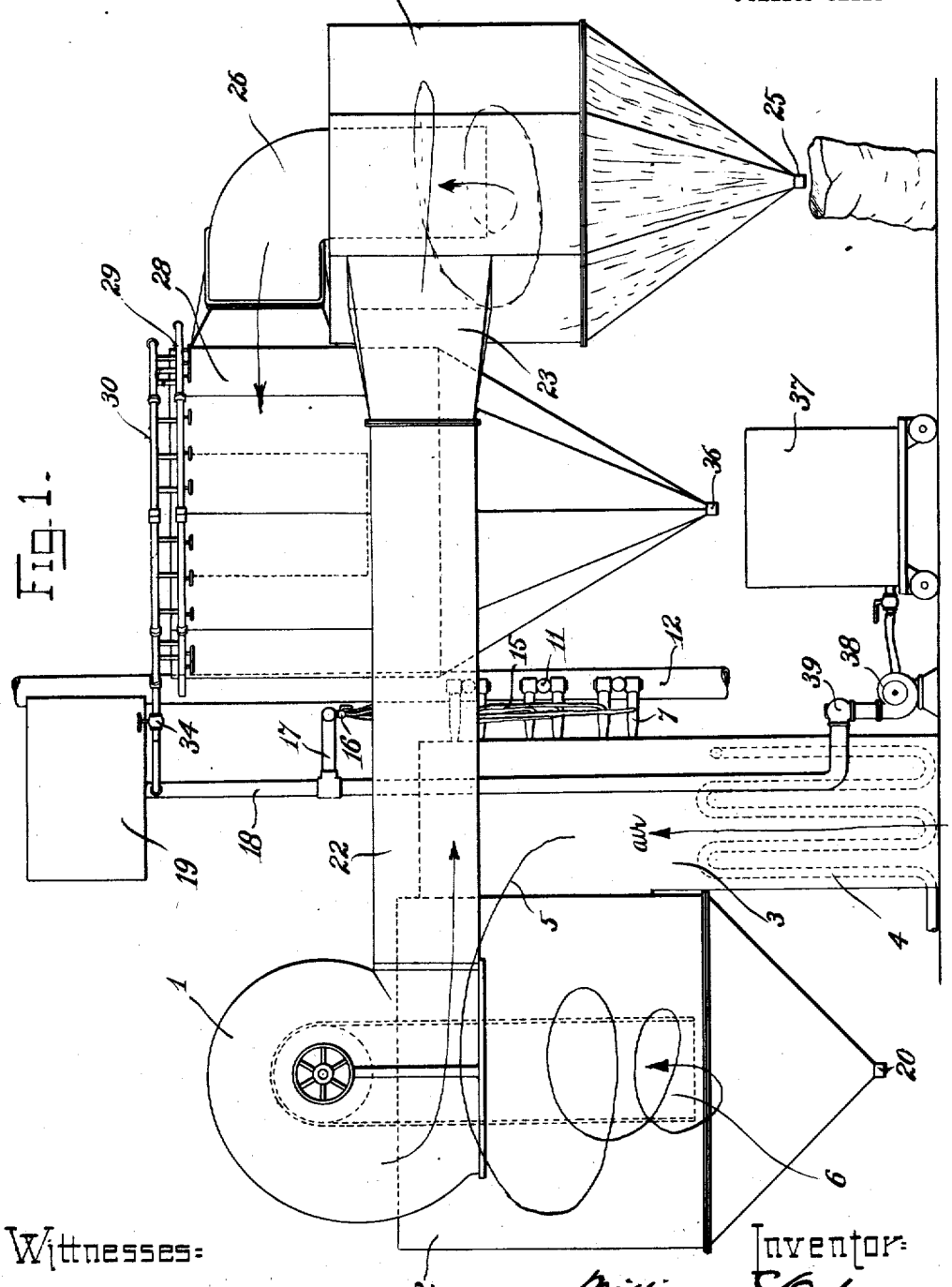

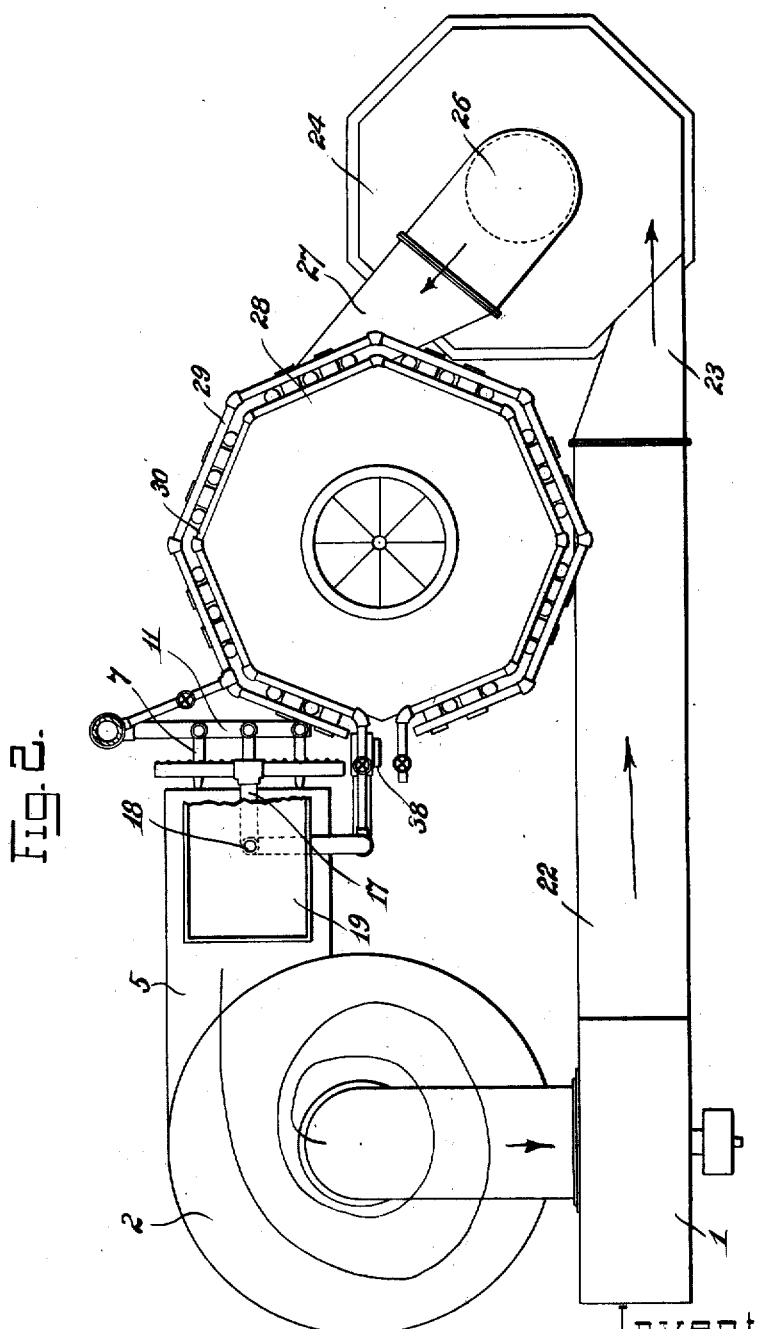

UNITED STATES PATENT OFFICE.

WILLIAM S. OSBORNE, OF HYDE PARK, MASSACHUSETTS, ASSIGNOR, BY MESNE ASSIGNMENTS, TO AMERICAN DESICCATING COMPANY, A CORPORATION OF MAINE.

METHOD OF DESICCATING FLUID SUBSTANCES.

962,781. Specification of Letters Patent. Patented June 28, 1910.

Application filed November 8, 1906. Serial No. 342,547.

*To all whom it may concern:*

Be it known that I, WILLIAM S. OSBORNE, a citizen of the United States, residing at Hyde Park, in the county of Norfolk and State of Massachusetts, have invented certain new and useful Improvements in Methods of Desiccating Fluid Substances; and I do hereby declare the following to be a full, clear, and exact description of the invention, such as will enable others skilled in the art to which it appertains to make and use the same.

The present invention relates to an improved method of desiccating fluid substances.

Many substances of a normally-fluid character, such as milk, eggs, and various fruit juices, are used in more or less concentrated or desiccated condition in the manufacture of various food products. Thus, for example, the solid components suspended and dissolved in milk are used in the manufacture of chocolate, butter, and cheese, while the solid components of fruit juices are used in the form of jelly and of flavoring extracts, the water forming the bulk of such substances being extracted by various well-known methods adapted to the particular substances operated upon. In order to facilitate the desiccation of such substances it has been proposed to introduce them in a finely-divided or atomized condition into a current or body of air being preferably warmed, so that each particle of material will be exposed to the drying action of the air and will be almost immediately desiccated and reduced to a particle of solid material, the material being then collected by gravity or otherwise. This method enjoys the advantages that it is rapid, the production of thoroughly desiccated material beginning almost immediately upon the inception of the process, and that it does not necessitate heating the material sufficiently to alter its character. It also is particularly well adapted to the preparation, in a portable and permanent form, of such articles as milk and eggs, which can be preserved, in their natural state, only for short periods and by the exercise of extraordinary precautions. Such substances, when thoroughly freed from water, are protected from fermentation and may be stored and handled like other solids.

The process above referred to, as heretofore practiced, has been unsatisfactory owing to the precipitation upon the surfaces of the apparatus of the atomized particles of material before they are thoroughly desiccated, and to the difficulty of completely collecting the desiccated material without waste, and the object of the present invention is to produce a method of carrying out this process by which these difficulties are avoided and by which the production of a thoroughly desiccated product is generally improved, and rendered more economical and satisfactory.

The invention consists in the method hereinafter described, as defined in the claims.

In the drawings Figure 1 is an elevation of an apparatus for carrying out the improved method herein described. Fig. 2 is a general plan view of the apparatus, Fig. 3 is a detail section through one of the spraying devices, and Fig. 4 is a detail horizontal section through one of the atomizers.

The process carried out by the apparatus of the drawings, briefly described, consists in introducing the material to be desiccated in a finely-divided or atomized condition to a current of warm air, maintaining the air in motion and the material in suspension until the material is thoroughly desiccated, separating the bulk of the desiccated material from the air by a method of dry dust collection, introducing a spray of liquid, preferably of the liquid material, into the air current to collect the residue of the desiccated material, and collecting the sprayed material and reintroducing it through the atomizing devices to be again desiccated.

The current of air by which the material is desiccated is induced by an exhauster 1, which is an ordinary centrifugal fan, through the suspension chamber 2 in which the material is desiccated. The air enters the bottom of a vertical air trunk 3 which is provided at its lower portion with steam coils 4 to warm the air. From the trunk 3 the air passes horizontally through a passage 5, entering the suspension chamber 2 tangentially, as shown in Fig. 2. Within the suspension chamber the air takes up a whirling motion owing to the circular form of the chamber and the direction of the inlet, and after passing several times around the chamber the air enters the lower end of the outlet trunk 6, which is centrally disposed in the suspension chamber and is connected at its upper end with the eye of the exhauster 1. The upper portion of the air trunk 3 is provided with openings into which a number of atomizers 7 discharge. These atomizers each comprise an inner jet tube 8 through which the fluid material is fed, and an outer concentric tube 9 through which compressed air is introduced. The atomizers are mounted upon vertical nipples 10 fixed on horizontal air-supply pipes 11 which connect at their ends with the main air supply pipe 12, connected with a suitable source of compressed air. The nipples 10 have lateral openings 13 which communicate with the air tubes 9 when the atomizers are in operative position, but when it is desired to examine or clean one of the atomizers it may be swung to one side, whereupon the passage in the air tube 9 ceases to register with the outlet 13, thereby shutting off the air from the atomizer in question without interfering with the operation of the other atomizers. The tube 8 of each atomizer is connected, as shown in Fig. 1, by means of a flexible tube 15 controlled by a stop cock 16, with the material-supply pipe 17 through which the material to be desiccated is delivered the supply pipe 17 being connected with a vertical pipe 18 entering at its upper end a supply tank 19. Owing to the above-described arrangement the material is introduced into the current of air flowing into the suspension chamber 2 in a finely divided or atomized condition, and during the protracted passage of the air current through the suspension chamber the particles of material are thoroughly desiccated so that when the air finally emerges through the outlet 6 the material is suspended in the air in the form of a fine dry powder or dust. Any material which collects upon the walls of the suspension chamber in its liquid form will run down through the conical bottom of the chamber and escape through an outlet 20, but it is to be noted that since the air is exhausted from the outlet 6 and not forced into the inlet of the suspension chamber its tendency is toward the center of the chamber so that there is little tendency of the material to be projected against the walls of the chamber, and furthermore, since the general direction of motion of the air current in the chamber is centripetal the tendency of the material to fly out of suspension through the action of centrifugal force is largely counteracted.

The current of air and material, after passing through the exhauster 1, passes through a horizontal trunk 22 and enters tangentially, at 23, a collector 24, which is an ordinary form of centrifugal dust collector. Here the bulk of the desiccated material is collected from the air current by impinging against the walls of the collector owing to the whirling motion of the air therein, and the material so collected escapes through the outlet 25 at the bottom of the collector as the finished product of the process herein described. A portion of the desiccated material, particularly the finer powder, escapes the collector 24 and passes with the air current out through the outlet trunk 26. In order to collect this residue the air current is introduced through a tangential inlet 27 to another similar collector 28. The collector 28 is provided with means for introducing a spray of liquid into the air current to collect the desiccated material remaining therein. A compressed air pipe 29 and a liquid-supply pipe 30 surround the upper portion of the collector 28 and are connected respectively with the compressed air main 12 and the liquid supply pipe 18. At intervals about the periphery of the collector 28 the pipes 29 and 30 are connected by horizontal and vertical pipes 31 and 32 as shown in Fig. 3, and the horizontal pipes 31 enter the casing of the collector. Through valves 33 in the pipes 31 a regular flow of compressed air may be admitted to the collector, and through a valve 34 in the pipe 30 liquid material is introduced through the connecting pipes 32, into the pipes 31, and is blown into the collector in the form of a fine spray by means of the compressed air. This spray mingles with the air entering through the inlet 27 and whirls about in the interior of the collector, and the dust remaining in the air is collected by contact with the liquid spray and is deposited therewith upon the walls of the collector. The fluid so collected runs through the conical bottom of the collector and issues through an outlet 36 into a tank 37.

The tank 37 is connected with a rotary pump 38 by which the liquid is withdrawn from the tank and forced upward through a check valve 39 and through the pipe 18 into the supply tank 19. By this arrangement the liquid material used to collect the residue of the desiccated material is saved and both the liquid and the desiccated material dissolved or suspended therein may be used over again in the collector 28, and are eventually reintroduced through the atomizers 7 to the air current to be again atomized and desiccated. Thus no part of the product escapes through the apparatus, and the material, as introduced to the atomizers, acquires, after the apparatus has been in use for some time, a denser consistency than when first introduced, owing to the collection of the desiccated material in the collector 28, so that its desiccation is facilitated.

Although the use of the dry collector 24 permits the immediate obtention of a finished product, it should be noted that the apparatus may be operated without this collector, the fan being arranged to deliver direct to the spray collector. With such an arrangement the materials supplied to the apparatus will become more and more dense until the required degree of desiccation is obtained, and such a process may be carried out where it is desired merely to condense and not to thoroughly dry the material.

An important feature of the invention consists in the use of means, such as the suspension chamber 2, whereby the air current, after the introduction of the material, is maintained in motion for a substantial period of time and the material is maintained thus in suspension in the air until it has been thoroughly desiccated.

Although in the preferred embodiment of the invention the liquid used in the spray collector is the liquid material to be desiccated, it is not necessary that this be used, since pure water or other liquid may be used in this connection, particularly where the substance operated upon is of too viscous a character to be conveniently used in the spray collector, as, for example, in desiccating eggs. In such a case the material collected in the spray collector is not lost, since the water or other liquid so used may be introduced to the atomizers along with the liquid material, and the material thereby is recovered from the spraying liquid.

In the apparatus of the drawings the supply of material may be conveniently replenished by addition to the contents of the tank 37, such addition being raised by the pump 38.

The invention is not limited to the use of any particular means for maintaining the air current in motion, since various means may be used in which the air may traverse a path of a non-circular character, the essential feature being the maintenance of the motion of the air for a suitable length of time and the avoidance of projection of the suspended material against the walls of the apparatus until it has become desiccated.

The invention is not, in general, limited to the details of the herein described method, but may be performed by apparatus of other forms within the scope of the following claims.

Having now described the invention, what is claimed is:

1. The method of desiccating fluid substances which consists in forming an air current, introducing material in atomized condition to said air current, maintaining said air current by renewing the air constantly in sufficient volume to desiccate the material, separating the material from the air, by creating a whirling motion and discharging the air, the separation and discharge being effected without clogging by the product, substantially as described.

2. The method of desiccating fluid substances which consists in introducing the material in atomized condition to a current of air, maintaining the air in motion and the material in suspension until the material is desiccated, and then introducing into the air a liquid spray to collect the material, substantially as described.

3. The method of desiccating fluid substances which consists in introducing the material into a current of air, maintaining the air in motion and the material in suspension until the material is desiccated, separating the bulk of the material from the air by a method of dry collection, and collecting the residue by introducing a liquid spray to the air, substantially as described.

4. The method of desiccating fluid substances which consists in introducing the material to a current of air, maintaining the air in motion and the material in suspension until the material is desiccated, introducing a liquid spray to the air to collect the desiccated material, collecting the liquid, and re-introducing the liquid and the material contained therein into the air current in atomized condition and again desiccating the material, substantially as described.

5. The method of desiccating fluid substances which consists in introducing the fluid material in atomized condition to a current of air, maintaining the air in motion and the fluid in suspension until the material is desiccated, introducing more of the fluid material in a spray to collect the desiccated material, collecting the sprayed material, re-introducing it in atomized form, and again desiccating it, substantially as described.

6. The method of desiccating fluid substances which consists in introducing the fluid material in atomized condition to a current of air, maintaining the air in motion and the material in suspension until the material is desiccated, collecting the bulk of the desiccated material by a method of dry collection, introducing to the air current a spray of the liquid material to collect the residue of the desiccated material, collecting the sprayed material, re-introducing it in atomized form to the air current, and again desiccating it, substantially as described.

7. The method of desiccating fluid substances which consists in introducing the fluid material in atomized condition to a current of air, maintaining the air in motion and the material in suspension until the material is desiccated, separating the bulk of the material from the air centrifugally, introducing to the air current a spray of the liquid material to collect the residue of the desiccated material, collecting the sprayed material, re-introducing it in atomized form to the air current, and again desiccating it, substantially as described.

8. The method of desiccating fluid substances which consists in introducing the material in atomized condition to a current of air, inducing a whirling motion in the air, withdrawing the air and suspended material from the center of the vortex thus formed, and collecting the material from the air, substantially as described.

9. The method of desiccating fluid substances which consists in introducing the material in atomized condition to a current of air, inducing a whirling motion in the air, withdrawing the air and suspended material from the center of the vortex thus formed, and separating the material from the air centrifugally, substantially as described.

10. The method of desiccating fluid substances which consists in introducing the material in atomized condition to a current of air, inducing a whirling motion in the air, withdrawing the air and suspended material from the center of the vortex thus formed, separating the bulk of the material from the air centrifugally, and introducing to the air current a spray of liquid material and thereby collecting the residue of the material, substantially as described.

11. The method of desiccating fluid substances which consists in introducing the material in atomized condition to a current of air, inducing a whirling motion in the air, withdrawing the air and suspended material from the center of the vortex thus formed, separating the bulk of the material from the air centrifugally, introducing into the air a liquid spray to collect the residue of the desiccated material, collecting the sprayed material, re-introducing it in atomized form to the air current, and again desiccating it, substantially as described.

12. The method of desiccating fluid substances which consists in forming a current of air, introducing the material in atomized condition to said current of air, maintaining said air current by renewing the air constantly in sufficient volume to desiccate the material, separating the material from the air centrifugally and discharging the air without clogging by the product, substantially as described.

13. The method of desiccating fluid substances which consists in forming a whirling air current in one chamber and forcing the air therefrom into a separating chamber, introducing material in atomized condition to said air current whereby it is desiccated, withdrawing the material with the air and forcing it with the air into said separating chamber, separating the material from the air by a vortex action, and discharging the air from the separating chamber, said separation and discharge being effected without clogging by the product, substantially as described.

14. The method of desiccating fluid substances which consists in introducing material in atomized condition into a whirling air current, exhausting the air and the material from said chamber, forcing the air and material into a separating chamber, and separating the material from the air by a vortex action and discharging without clogging by the product, substantially as described.

15. The method of desiccating milk which consists in introducing the milk in atomized form to a current of air, thus causing the air to absorb the water contained in the milk, then partially separating the dried particles of milk from the air current, and then introducing said air current and its residual particles of dried milk into liquid milk and effecting a still further separation of the dried milk particles from said air, substantially as described.

In testimony whereof I affix my signature, in presence of two witnesses.

WILLIAM S. OSBORNE.

Witnesses:
  HORACE VAN EVEREN,
  C. E. SNOW.